(12) United States Patent
Nichols et al.

(10) Patent No.: US 7,765,245 B2
(45) Date of Patent: Jul. 27, 2010

(54) SYSTEM AND METHODS FOR ENHANCED METADATA ENTRY

(75) Inventors: Jonathan L. Nichols, San Mateo, CA (US); Randy Fish, San Mateo, CA (US); Paul Pantera, San Mateo, CA (US)

(73) Assignee: Universal Electronics Inc., Cypress, CA (US)

( * ) Notice: Subject to any disclaimer, the term of this patent is extended or adjusted under 35 U.S.C. 154(b) by 15 days.

(21) Appl. No.: 11/728,734

(22) Filed: Mar. 27, 2007

(65) Prior Publication Data

US 2007/0233740 A1 Oct. 4, 2007

Related U.S. Application Data

(60) Provisional application No. 60/787,066, filed on Mar. 29, 2006.

(51) Int. Cl.
*G06F 17/30* (2006.01)
(52) U.S. Cl. .............. 707/825; 707/999.002; 707/999.104; 707/736; 709/219; 705/7
(58) Field of Classification Search ............ 707/3, 707/7, 104.1, 999.104, 825; 705/7; 709/219
See application file for complete search history.

(56) References Cited

U.S. PATENT DOCUMENTS

| 6,760,721 | B1 * | 7/2004 | Chasen et al. ............... 707/3 |
| 6,921,324 | B1 | 7/2005 | Chang et al. |
| 7,003,515 | B1 | 2/2006 | Glaser et al. |
| 2003/0236582 | A1 * | 12/2003 | Zamir et al. ............... 700/94 |
| 2005/0240494 | A1 | 10/2005 | Cue et al. |
| 2005/0240661 | A1 * | 10/2005 | Heller et al. ............... 709/219 |
| 2006/0015378 | A1 | 1/2006 | Mirrashidi et al. |
| 2006/0156236 | A1 * | 7/2006 | Heller et al. ............... 715/716 |
| 2006/0168340 | A1 | 7/2006 | Heller et al. |
| 2007/0038941 | A1 | 2/2007 | Wysocki et al. |

\* cited by examiner

*Primary Examiner*—Apu M Mofiz
*Assistant Examiner*—Monica M Pyo
(74) *Attorney, Agent, or Firm*—Greenberg Traurig, LLP

(57) ABSTRACT

A system and methods for facilitation of enhanced user interactions with metadata corresponding to one or more media files. A number of user interface methods are described and may be used alone or in combination with one another to present an enhanced metadata entry and modification interface to a user. A method of providing for automated step through of media files for metadata entry is described, as well as a method for quickly presenting the user with the most appropriate media sample from which an appropriate metadata entry or modification can be made by the user.

18 Claims, 7 Drawing Sheets

US 7,765,245 B2

SYSTEM AND METHODS FOR ENHANCED METADATA ENTRY

RELATED APPLICATIONS

This application claims the benefit of U.S. Provisional Application No. 60/787,066, filed on Mar. 29, 2006, which application is hereby incorporated by reference in its entirety.

BACKGROUND OF THE INVENTION

This invention relates generally to a system and method for enhanced entry of metadata. Exemplary applications include media management and organization programs for use on computing and/or entertainment appliances and associated media files, such as audio, photo, video files, and the like.

Media management applications, such as those that are able to organize, categorize, play, and interact with media files, such as audio, photo, video files, and the like, are known in the art. For example, both Microsoft Corporation of Redmond, Wash., and Apple Computer Corporation of Cupertino, Calif. have well known media management applications and or suites named, respectively, "Windows Media Player 11" and "iLife '06".

While these known media management applications serve to provide basic media organization and interactivity functions, a need remains for an improved method of entering and using metadata associated with the media files resident in such applications in order to provide an improved user experience.

SUMMARY OF THE INVENTION

In accordance with the description that follows, a system and method is provided for enabling enhanced user entry, interaction, and display of metadata associated with media files generally via an exemplary media management application. An understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which.

DETAILED DESCRIPTION

An exemplary media management application 100 and associated interface system and methods are provided for executing on a computing device or entertainment appliance. By way of example, representative platforms for executing the media management application 100 include, but are not limited to, devices such as remote controls, personal computers, lap-top computers, game consoles (e.g., the Sony Playstation, Microsoft Xbox, Nintendo Wii, etc.), Smart Displays, Web Tablets and/or PDAs manufactured by HP/Compaq (e.g., the iPAQ brand PDA), Palm, Visor, Sony, etc., mobile phones (e.g., Microsoft based Smart Phones, Palm OS and/or Symbian OS based phones), personal gaming systems (e.g., Nintendo GameBoy, Nokia N-Gage, Sony PlayStation Portable, etc.), digital video recorders (DVR's), cable or satellite set top boxes (STB's), media renderers and media streaming devices (e.g., the RokuLabs PhotoBridge, Dlink Media Lounge, Microsoft Media Center Extenders, etc.). For entry of user data into the platform to effect the system and methods described herein any known method or apparatus for user interface entry may be used, including but not limited to keyboards, mice, touch screens, voice or gesture based input systems, remote controls (both IR and RF), etc.

Figure 1:
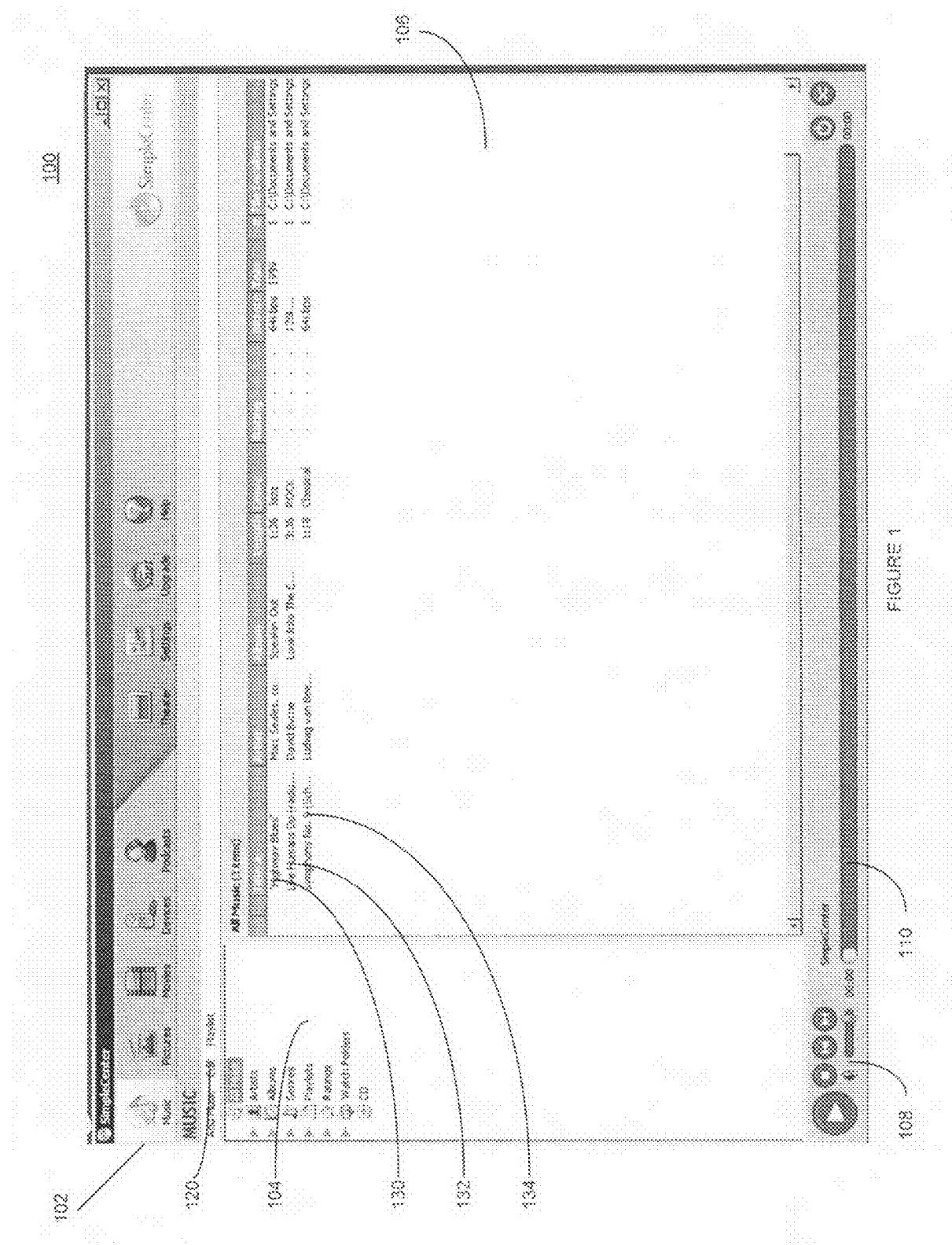
FIG. 1 illustrates an exemplary user interface for a media management application.

Referring now to FIG. 1, exemplary media management application 100 is shown for organizing, interacting with, and managing media content. As will be appreciated, the machine executable instructions which provide for the performance of the various steps, methods, functions, etc. associated with the media management application 100 may be embodied on a machine readable media, such as an electrical memory device (e.g., RAM, ROM, EEPROM, Flash Memory, Memory Stick, Smart Card, hard disk drive, etc.), an optical memory device (e.g., CD, DVD, etc.), or the like. In an illustrative embodiment of the media management application 100, a content selection user interface is provided that includes a left pane 104 for user selection of different organizational views of media content managed by the application 100 and right pane 106 for viewing and interacting with individual media files 130, 132, and 134. Top pane 102 allows for selection of different types of media as well as extended application functions and features. Media transport functions 108 allow typical transport functionality for individual media files, and slider 110 generally indicates the play location status for a currently playing media file. Function selection menu 120 allows for a user to initiate one or more secondary interfaces for entry and interaction with metadata, as will be described in greater detail below.

Figure 2:
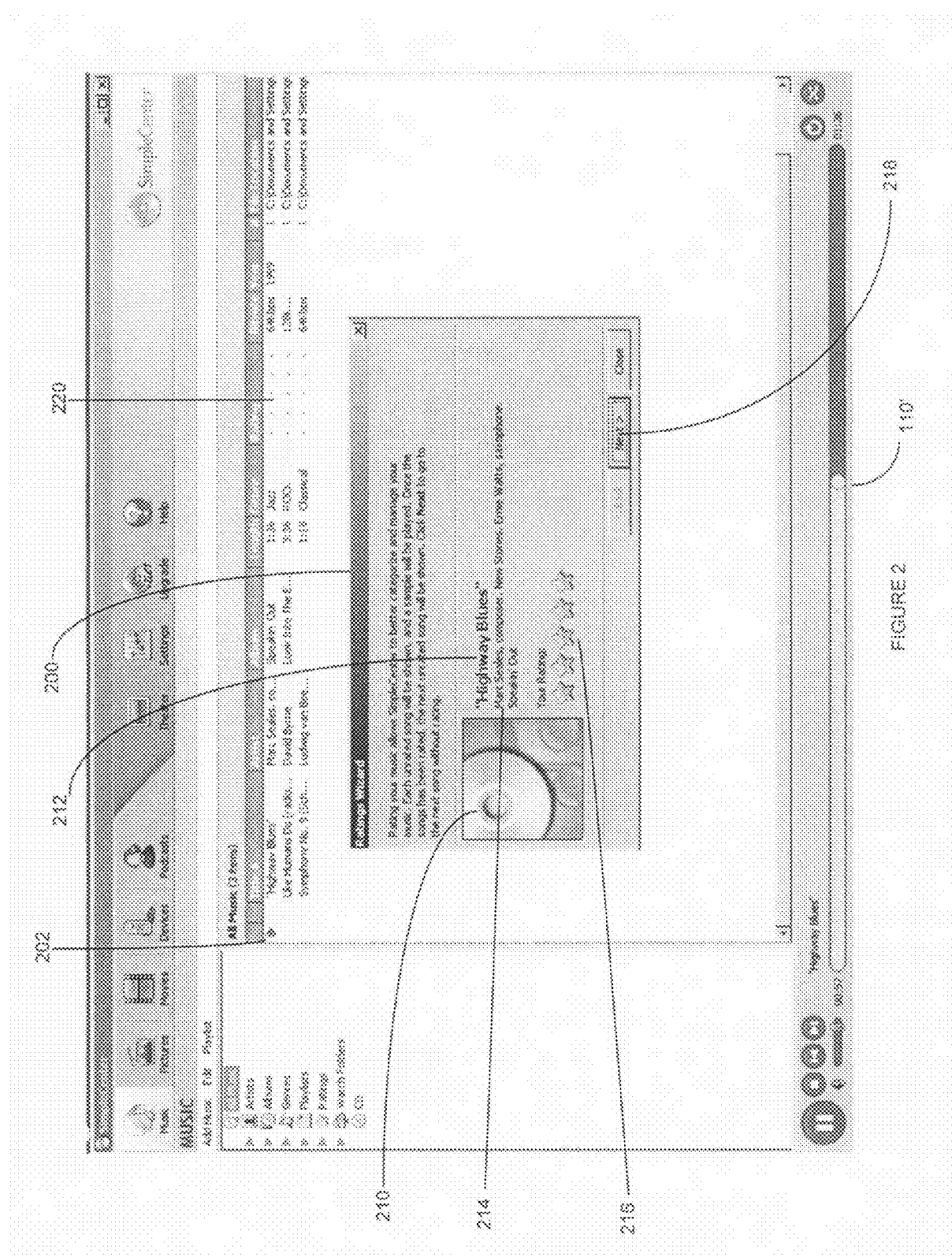
FIG. 2 illustrates an exemplary interface for entry of metadata for an audio media item.

Turning now to FIG. 2, a simplified and improved metadata input interface 200 is shown for easily adding, changing, or interacting with metadata for a particular media file. Indicator 202 shows the particular media file from which the metadata is currently displayed in simplified metadata input interface 200, which in the illustrated example is an audio file 130 titled "Highway Blues". Within simplified metadata input interface 200 several data fields, including, album art 210, title 212, artist info 214, and user rating 216 are displayed. In the illustrated example, only the user rating 216 field is configured to be changeable by a user, but it will be appreciated that any or all of fields 210-216, as well as other data fields, may be configured such that a user can add to, modify, or delete the information displayed. Metadata field 220 corresponds to the user rating 216 field and shows the data entered for audio file 130 via the simplified metadata interface 200 after such data has been input by a user.

In an exemplary metadata entry method, a user may first launch the simplified metadata interface 200 from the "Edit" section of function selection menu 120. Upon launch, programming in media management application 100 causes both the simplified metadata input interface 200 to display metadata fields 210-216 from the first item from right pane 106 that does not include an entry in metadata field 220 (media file 130 in the illustrated example) and the transport functions 108 to automatically begin playing media file 130 such that the user may recollect or recognize the content of the media file prior to entering data in the user rating 216 field. In order to provide for enhanced metadata entry which enables the user to make the best decision regarding his or her metadata entry in the shortest amount of time, it may be desired to configure programming in media management application 100 to begin playback of media file 130 (and each subsequent media file for which data entry is desired by the user) according to a preset parameter, for example at 100 seconds or at 50% into the media file. As illustrated by the position of slider 110' in FIG. 2, playback may commence at a preset time (or percentage of time) into media file 130 in order to quickly present the user with the most appropriate media sample from which a rating (e.g., one through five stars) can be made. Still further, playback may be commenced at the start of or within a portion of a file that is determined, through use of conventional data analysis/pattern recognition algorithms, to have data that appears to be similarly repeated throughout the file, i.e., data which would indicate a chorus or refrain within a song. Upon interaction of the user with user rating 216 field (generally via clicking with a cursor on the desired "star" rating), programming in media management application 100 causes the simplified metadata interface 200 to automatically advance to the next listed item from right pane 106 that does not include an entry in metadata field 220 (media file 132 in the illustrated example). If the user does not desire to enter metadata for a particular media file presented, use of the next button 218 or expiration of the sample play duration (which may be preset or user defined) for the particular media file will cause the simplified metadata interface 200 to advance to the next applicable media file without appending metadata to the then current media file. Programming in media management application 100 may be configured to present such unrated (or more generally files for which desired metadata has not previously been entered) media files on each subsequent use of the simplified metadata interface 200 until every media file listed in right pane 106 has been rated.

Figure 3:
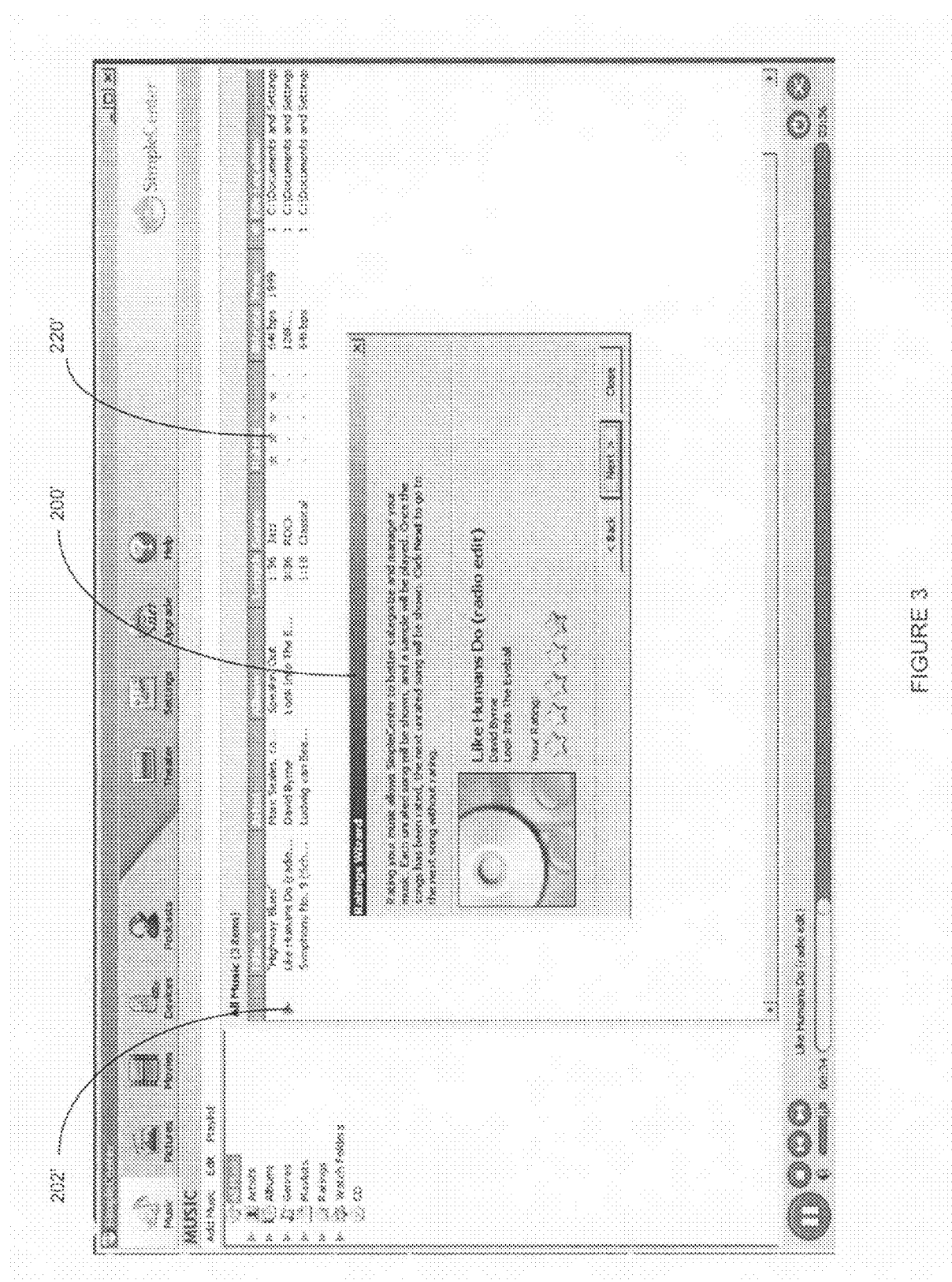
FIG. 3 illustrates another exemplary interface for entering metadata.

FIG. 3 shows simplified metadata interface 200', which, after user interaction with user rating field 216 includes new metadata corresponding to the second item for user rating shown by Indicator 202'. Metadata field 220' shows updated metadata in right pane 106 corresponding to the data previously entered by the user in user rating 216 field according to the above described method.

Figure 5:
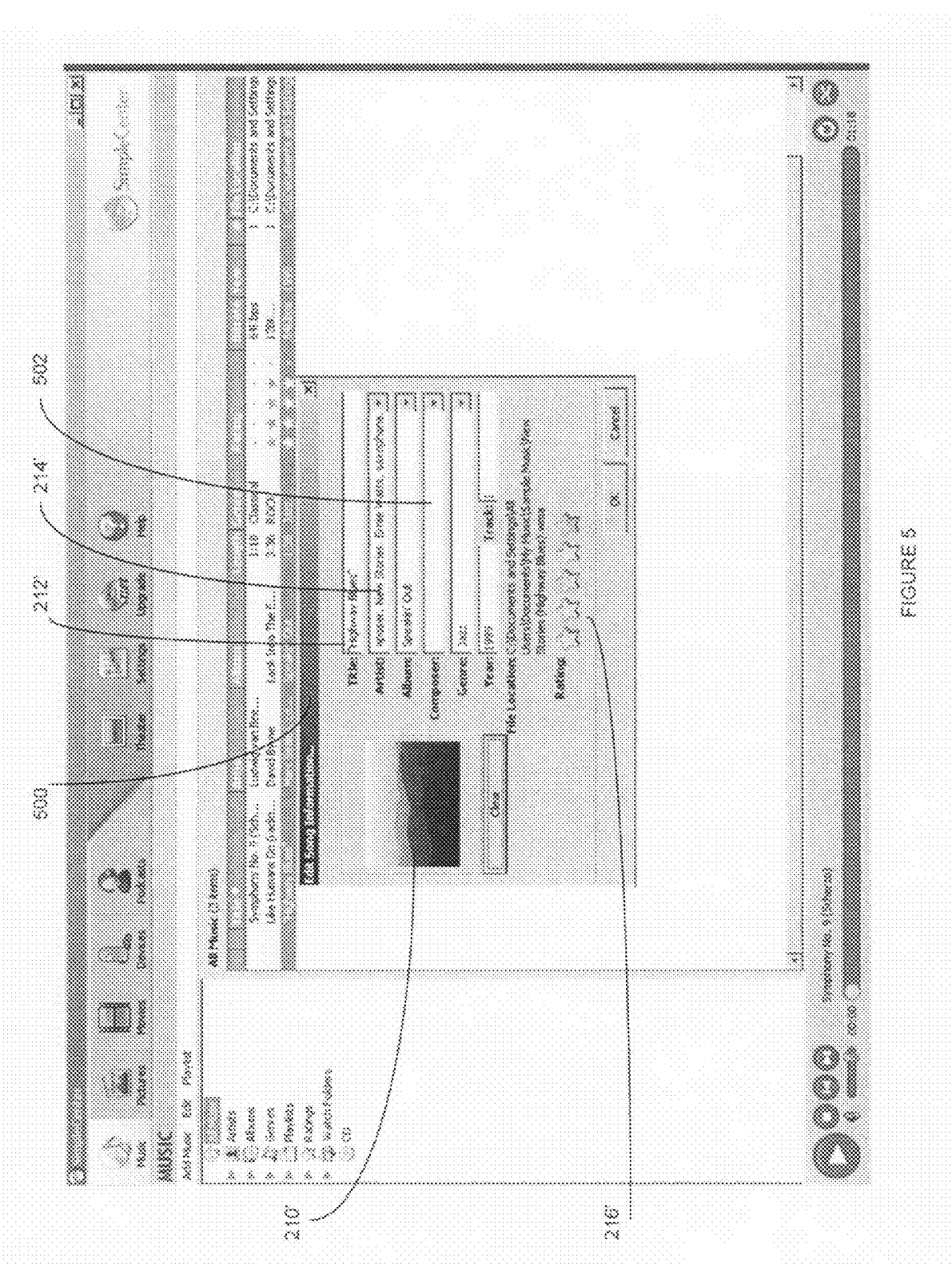
FIG. 5 illustrates an exemplary interface for both viewing and entering metadata for a particular audio media item.

Looking now to FIG. 5, a complete metadata interface 500 is illustrated for allowing a user to add, modify, or delete metadata using multiple editable metadata fields, including, in the example illustrated, album art 210', title 212', artist info 214', composer 502, user rating 216', and other miscellaneous extended metadata fields. In a similar method to that described in connection with FIG. 2 above, the user may add, modify, or delete metadata in each applicable field, advantageously entering the desired rating data in user rating 216' field last, such that upon automatically advancing to the next applicable media file for metadata entry, all desired fields have been appropriately modified by the user for the current media file. It will be appreciated that programming in media management application 100 may also be configured to begin playback of the currently displayed media file in complete metadata interface 500 according to a preset time into the media file and for either a preset duration or until the end of the media file in order to again quickly present the user with the most appropriate media sample from which entry of metadata can be made as described above.

Figure 6:
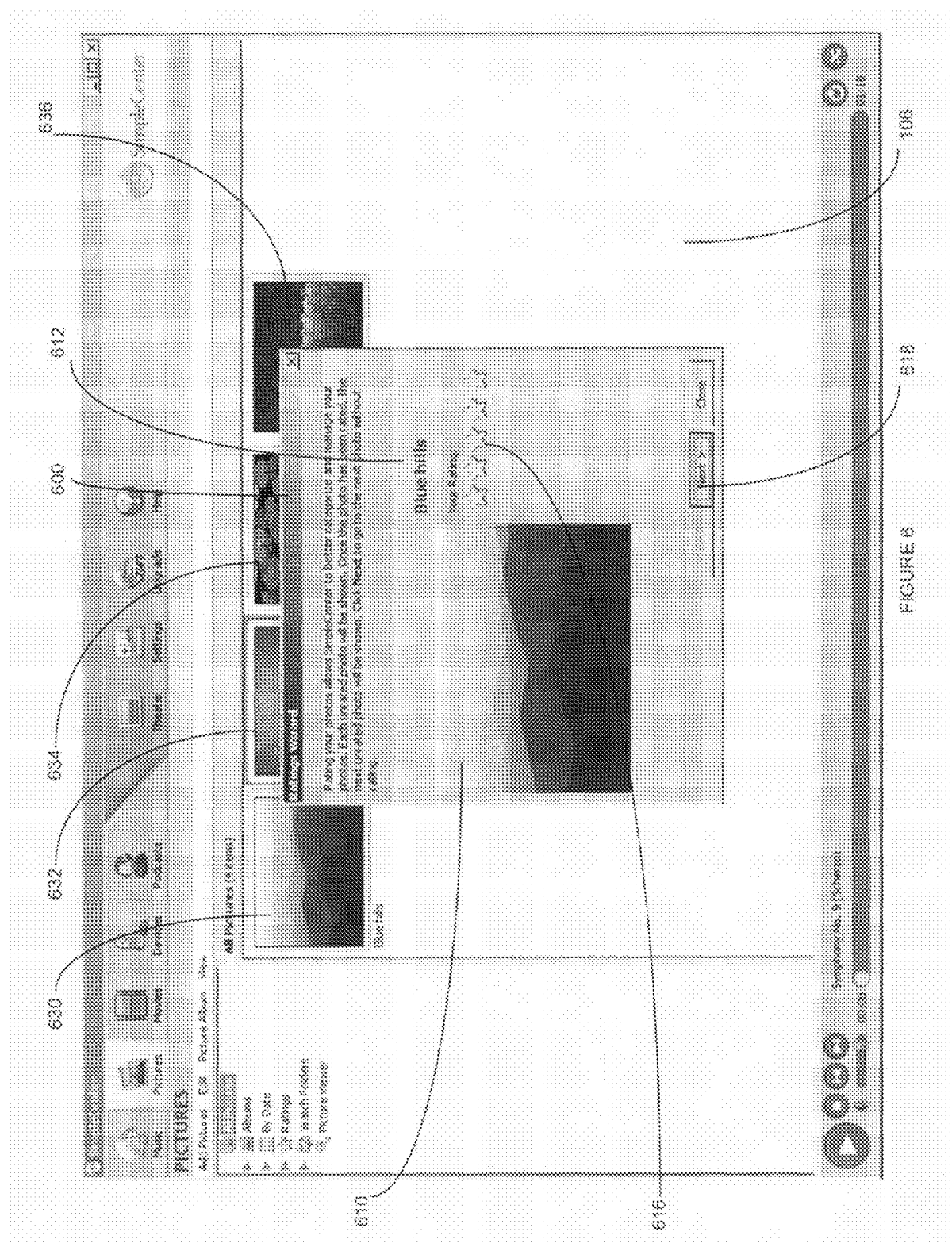
FIG. 6 illustrates an exemplary interface for entry of metadata for a photo media item.
Figure 7:
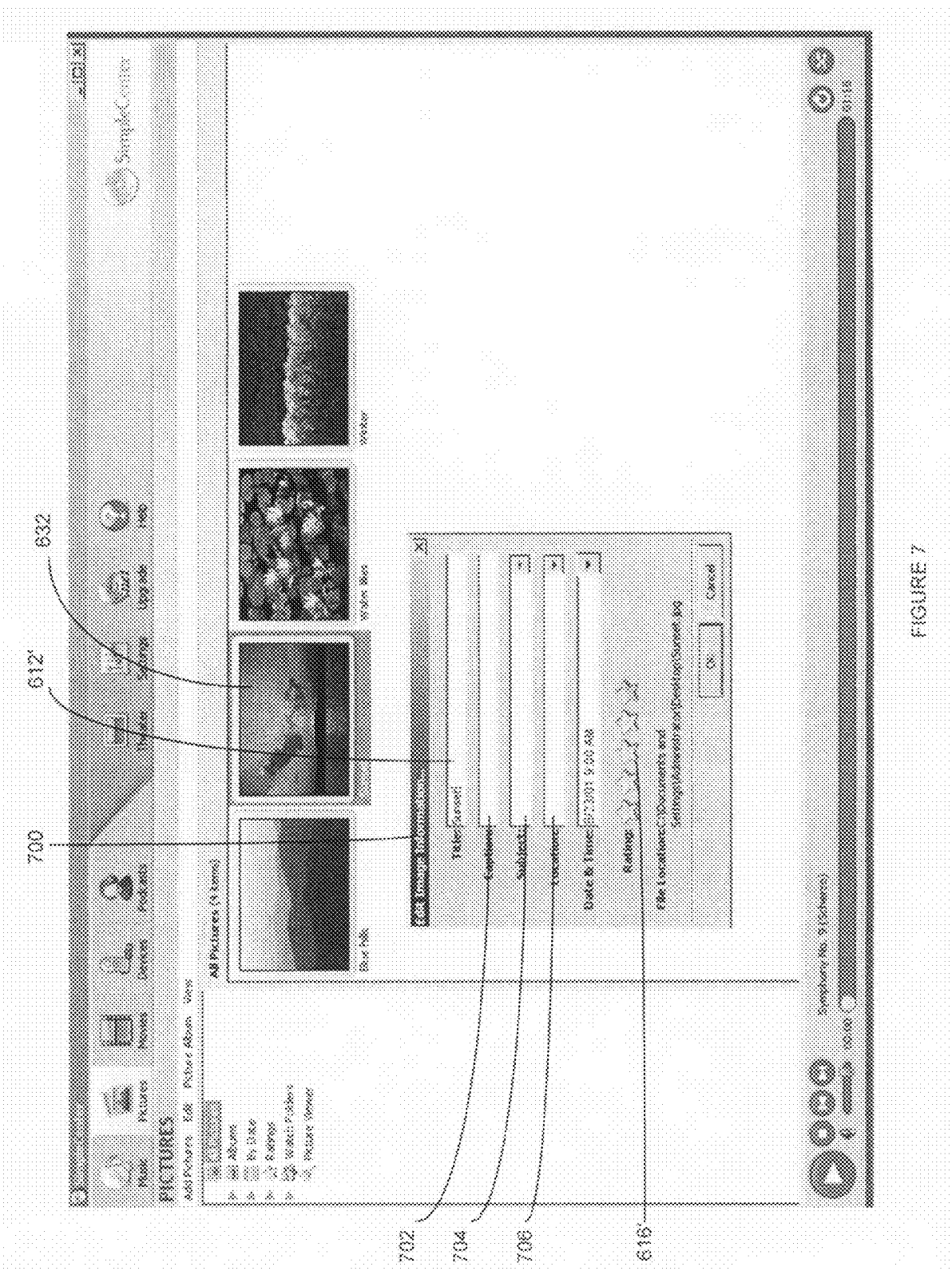
FIG. 7 illustrates an exemplary interface for both viewing and entering metadata for a particular photo media item.

FIGS. 6 and 7 illustrate both simplified metadata interface 600 and complete metadata interface 700 respectively for use in connection with photo media files 630, 632, 634, and 636.

In the example illustrated in FIG. 6, simplified metadata interface 600 includes media file preview 610 corresponding to photo media file 630 which may be caused to be displayed upon launch of simplified metadata interface 600 by a user. Title field 612 and user rating field 616 are also provided. In a similar method to that described in connection with FIG. 2 above, the user may indicate via interaction with user rating field 616 a desired rating for photo media file 630 metadata in the user rating field 616, such that upon automatically advancing to the next applicable media file for metadata entry, the user rating field 616 has been appropriately modified by the user for the current photo media file 630. In order to provide for enhanced metadata entry which enables the user to make the best decision regarding his or her metadata entry in the shortest amount of time, it may be desired to configure programming in media management application 100 to begin perform additional display operations for photo media file 630 (and each subsequent photo media file for which data entry is desired by the user) according to preset functions or parameters. By way of example, simplified metadata interface 600 may be configured to perform pan, scan, zoom, so called "Ken Burns" motion effects, and/or other photographic manipulations or enhancements in order to quickly present the user with the most appropriate media sample from which a rating of one through five stars can be made. Alternatively, the user may opt to forego the entry of metadata for a particular file by clicking the next button 618 and/or waiting for a preset preview time to expire. Programming in media management application 100 may be configured to present such unrated (or more generally files for which desired metadata has not previously been entered) media files on each subsequent use of the simplified metadata interface 600 until every media file listed in right pane 106 has been presented to the user for rating.

Looking now to FIG. 7, a complete metadata interface 700 is illustrated for allowing a user to add, modify, or delete metadata using multiple editable metadata fields, including, in the example illustrated, title 612', caption 702, subject 704, location 706, user rating 616', and other miscellaneous extended metadata fields. In a similar method to that described in connection with FIG. 6 above, the user may add, modify, or delete metadata in each applicable field, advantageously entering the desired rating data in user rating 616' field last, such that upon automatically advancing to the next applicable media file for metadata entry, all desired fields have been appropriately modified by the user for the current media file. It will be appreciated that programming in media management application 100 may also be configured to perform additional display operations for photo media file 632 (and each subsequent photo media file for which data entry is desired by the user) according to the preset functions or parameters described above, including pan, scan, zoom, so called "Ken Burns" motion effects, and/or other photographic manipulations or enhancements in order to quickly present the user with the most appropriate media sample from which modification of appropriate metadata can be performed. It will be understood and appreciated that while such additional display operations may be performed on the subject photo media file within its present location within right pane 106 as illustrated, secondary or auxiliary application windows may be configured to display and perform the additional operations to assist in user metadata entry without departing from the inventive concepts described herein. It will also be appreciated that when the visual content corresponding to the metadata being edited is video data, sample playback of the file maybe commenced at a fixed time or percentage into the content in a manner similar to that described earlier in connection with metadata entry for audio files.

Figure 4:
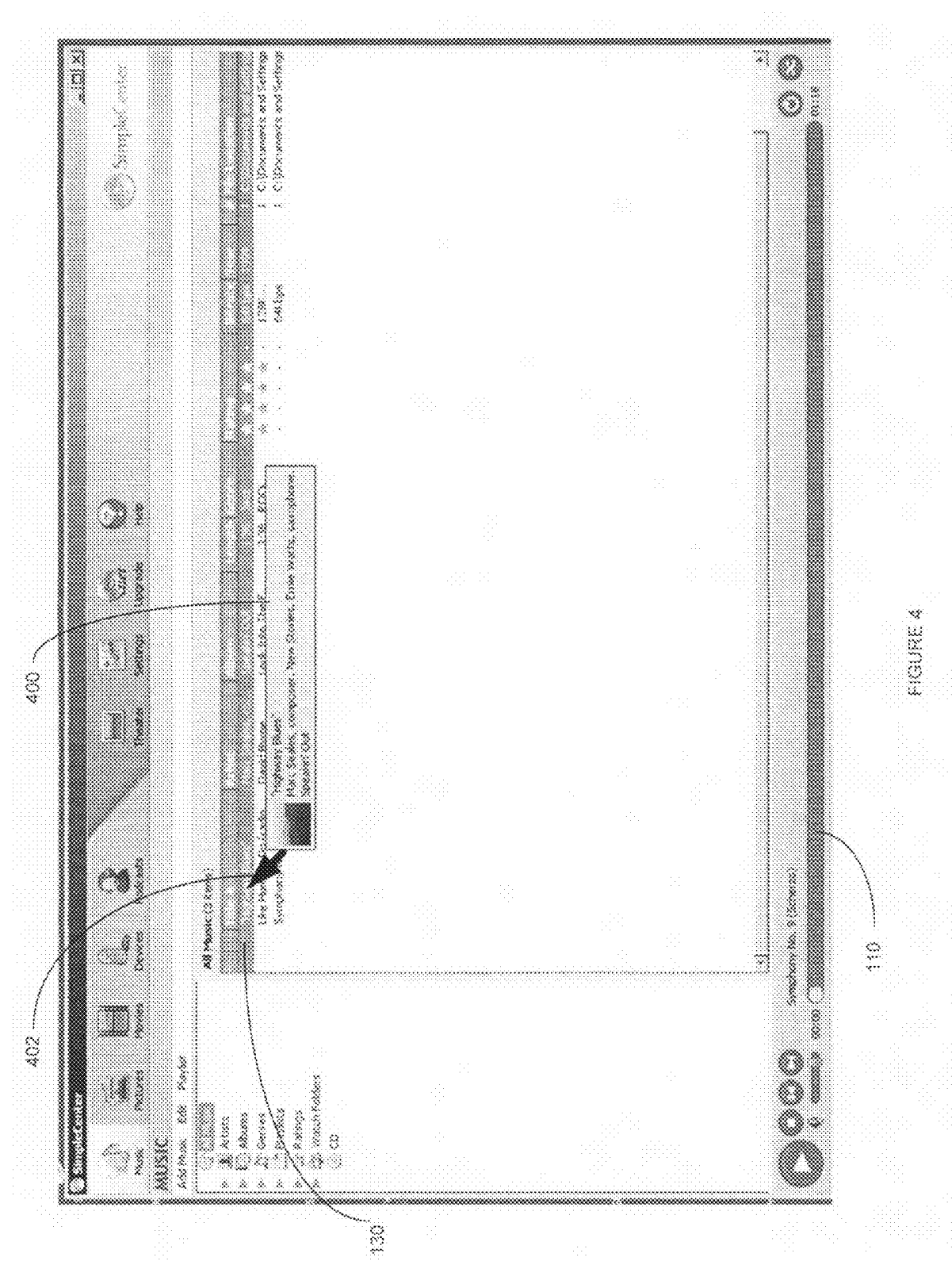
FIG. 4 illustrates an exemplary interface for viewing metadata for a particular media item.

Looking now to FIG. 4, an auxiliary metadata display interface 400 is illustrated. Auxiliary metadata display interface 400 may be configured by programming in media management application 100 to "pop up" or otherwise be caused to appear upon user interaction with cursor 402 and media file 130 for a predetermined length of time. Such cursor based information interfaces are well known and are commonly called "automated tool tips" or "mouse overs." According to the present invention, such tooltips as the auxiliary metadata display interface 400 may be configured to display any or all of the available metadata for media file 130, and additionally may be configured to, upon launch (generally via cursor based interaction with media file 130) begin automatically playing the content of media file 130. In the illustrated example where media file 130 is an audio file, the audio data would immediately begin playing upon launch of the auxiliary metadata display interface 400, however it will be understood and appreciated that any type of media file may be caused to automatically begin playback or display upon launch of an automated metadata display interface such as the auxiliary metadata display interface 400 shown in FIG. 4. It will also be understood that playback of the media files according to this present inventive concept may be configured at some predetermined or preset parameter, for example at 100 seconds, at 50% into the media file, at or within a discerned refrain, etc.

By way of further example, the features and functions of an exemplary media management application which supports both simplified metadata editing interfaces (e.g., 200, 600 as described above) and complete metadata editing interfaces (e.g., 500, 700 as described above) are described in the following feature set definition of the "SimpleCenter" media management software which is commonly owned by the assignee of this patent application:

SimpleCenter™ 4.0 Feature Set

Platforms: SimpleCenter is based on Java 1.5 and has been tested to run on Windows 98SE, ME, 2000, XP Home, and XP Professional operating systems.

Media Acquisition

File Chooser: Media files can be added through a standard file chooser. Both files and folders can be chosen. When a folder is chosen, the contents of that folder is scanned for supported audio, photo, and video media.

Add to playlist: An option to add selected media to a playlist is included in the file chooser.

Watch Folders

Folders can be designated as Watch Folders. These folders are scanned periodically for changes. New media that is found is added to the media library, deleted media is removed from the media library. This is done automatically, i.e. without requiring the user to invoke a new search. Folder Hierarchy: The hierarchy of each watch folders is replicated in the Music, Photos, and Movies section if media of that type is found in a watch folder. This folder hierarchy is available to devices for browsing and playback.

Metadata Editing

Metadata information is editable by end users. The metadata editing interface includes pop-up menus that include all values currently in use in the media library for that field. While typing, text is auto-completed based on the items in that menu. The following fields are editable:

Music (Title, Artist, Album, Genre, Composer, Year, Track Number, Album Art)

Photos (Title, Subject, Location, Caption, Date/Time)

Movies (Title, Director, Producer, Year, Genre, MPAA Rating, Subtitle File)

Property Rename: Right-clicking on an artist, album, or genre displays a menu that includes a 'Rename' item. Entering a new value renames that property in each of the items within the item.

ID3: ID3 data is read from MP3 files on import. When an end user changes this media information, new metadata is written back to the media file.

WMA Metadata: WMA metadata is read from WMA files on import. When an end user changes this media information, new metadata is written back to the media file.

Album Art: When importing files on the Windows platform, SimpleCenter automatically looks for album art images stored in the same folder as the music tracks. Additionally, users may manually assign album art within SimpleCenter by selecting "Edit Song Information". Album art is then made available to media players using the media server content directory service. Media players are able to select an image (PNG or JPEG) to be used as album art while browsing or playing music tracks.

Playlists: Playlists in the M3U and PLS formats may be imported for internal use. Information embedded into JPEG files by digital still cameras is used to determine metadata (e.g. date).

Ratings: User can Assign a rating to each content item using a 1-5 star scale.

Media Management

List View

Sorting: Content can be sorted (ascending and descending) by clicking on column headers.

Resizing: Columns are resizable (click and drag) and auto-resizable (double click)

Item Count: Displays the number of items within a list.

Delete: When media is removed from the SimpleCenter database, SimpleCenter gives the user the option to delete the media from the hard disk.

Playlists: Users are able to create playlists of music, pictures, and movies. Photo playlists are called Picture Albums. Movie playlists are called Movie Collections.

Folders: Folders can be created that contain playlists. End users then add tracks to each playlist.

Music Organization: The All Music container includes all music in the media library. Music is automatically organized by Artist, Album and Genre.

Date View:

Photos are automatically organized into a Date View (Year-Month).

Thumbnail View

Photos are shown as a thumbnail by default.

Ratings View

Items are automatically added to a ratings container that corresponds to the user assigned rating.

Ratings Wizard

An interactive ratings wizard helps the user assign a rating to each item in their library.

Audio

Each unrated audio track is played until the user sets a rating or skips to the next unrated item. If available the album art is shown while the item is being rated.

Photos
  Each unrated photo is shown to the user until the user sets a rating or skips to the next unrated item. The photo is shown as a thumbnail.
Video
  The title of each unrated video item is shown until the user sets a rating or skips to the next unrated item.

Playback
  Controls for play, pause, stop, next track, previous track and volume are provided. A shuttle control is provided to seek to a specific point in a track. A shuffle option can be enabled to play back items in the current container in random order. A repeat option can be enabled to repeat play back of items in the current list. Images can be displayed within the application as thumbnails or larger preview in the attached Picture Viewer pane. Movies play back in the attached Movie Viewer pane within the application.

CODECS
  Audio: MP3, WMA, AAC, 3GP, and WAV files are all supported for playback.
  Photos: JPEG, GIF, BMP, and PNG images are supported.
  Video: WMV, MPEG 1, MPEG 2, MPEG 4, 3GP, DivX 4 and 5, AVI, and VOB formats are supported.

Nationalization
  SimpleCenter supports editing media metadata including languages that use double-byte character sets. Various European and Asian languages are supported.

CD Ripper with CD Information Lookup
  The ability record CD Audio discs and/or individual tracks as digital media files is included. Music encoding may be in MP3 or WMA formats with a selection of several fixed bit rates. CD Information Automatic Lookup is supported if an Internet connection is available at the time of CD rip. CD information thus obtained may include:
    Artist
    Album Title
    Track Title
    Album Genre
    Album Art Work Theater Mode
  SimpleCenter Theater Mode presents all media libraries and containers in a TV-optimized user interface that is designed for navigation with a remote control.

Navigation and Control
  All navigation is done using up, down, left, right, and enter keys on keyboard or on compatible remote control. All media control is done using transport controls on compatible remote control. User can navigate and view all media containers as in PC mode. User can select music to play; "Now Playing" screen indicates elapsed time and displays album art, if available. User can view photos as thumbnails (8 to a screen) or in full-screen. User can view movies in full screen mode. Users can view slideshows of any picture album which are full screen pictures advanced automatically, with optional audio accompaniment. Slideshow settings are set in PC mode and may include:
    Audio accompaniment selection (any music playlist)
    Picture advance timing (# of seconds)
    Transition chooser
    Effects chooser
    Transitions
    Crossfade
    Effects
    Ken Burns Effect Remote Control Integration
  SimpleCenter includes on-screen instructions for setting up compatible remote control features such as device setup, volume lock, channel lock, etc.

UPNP Media Server
  SimpleCenter media server serves media to one or more network media players simultaneously. The SimpleCenter media server is compatible with UPnP AV Media Server specifications. SimpleCenter is a multithreaded media server that is able to serve audio, photo, and video media to up to three media players simultaneously The name of the media server, as it appears to client devices, is user configurable. The media server supports HTTP version 1.1. Support for the Range header is included, which allows media players to seek to specific locations in tracks, enabling media players to fast forward and rewind tracks. Content Directory Service, as defined by the UPnP AV Specification, is supported which enables network media players to browse and search the SimpleCenter media database. Shuffle: Media players are able to retrieve items in random order. Media players are able to scale and rotate images to conform to screen attributes.

UPNP Media Renderer
  SimpleCenter media renderer enables a network media player to render media stored on a separate network device, e.g., portable media server, on the SimpleCenter PC. The SimpleCenter media renderer is compatible with UPnP AV Media Renderer specifications. Any media format that is supported for local playback can be rendered. Server may be SimpleCenter or a $3^{rd}$ party media Server. Music: When a control point requests SimpleCenter to render music, it does so in PC Mode and the Now Playing information gets updated. Pictures: When a control point requests SimpleCenter to render a picture, it presents the picture in full screen. Movies: When a control point requests SimpleCenter to render a movie, it presents the movie in full screen. Devices: A list of all supported devices is displayed within SimpleCenter. Devices can be removed from this list.

Device Support
  UPnP AV Media Servers and Renderers: UPNP AV Media Server and Renderer devices, i.e., media players, are supported and displayed in the SimpleCenter Devices GUI pane.
  General Information: SimpleCenter displays basic information about a device, including its product name, manufacturer, serial number, version and IP address in the SimpleCenter Devices GUI pane. Users can enter a custom name for a device.
  Customized Device Tab: Additional Device configuration can be integrated into SimpleCenter, e.g., upgrade device firmware, select media to transfer to a device. For supported Devices the Basic Transfer or Advanced Sync UI is available. Basic item transfer from device to SimpleCenter is compatible with select third party devices. User can select individual items to transfer from the device to SimpleCenter. Transfer from SimpleCenter to selected compatible third party devices allows a user to select individual files to transfer from SimpleCenter to the device.
  Advanced Content Synchronization (Smart Sync) is compatible with select devices, using filtering rules to designate content items that should be synchronized between the PC and a specific media device. Filtering rules are dynamic and can be based on the following metadata items:
    Music (Tracks, Rating, Artist, Genre, Album,)
    Photo (Photos, Rating)
    Video (Videos, Rating)
    Podcasts (Episodes, Rating)

Remote Access to Media

Access to photo content is possible from a remote IP enabled device, allowing quick viewing of any photos stored on the PC from any web browser enabled, IP connected, device. Designated individual entire photo albums in the Photo Library may be shared with family and friends. Any album may be password protected. Email notifications may be issued to alert friends and family about shared photos.

Podcast Subscription Management

Podcast subscriptions may be managed (audio and video for all supported formats). Frequency of updates and storage space may be managed management (number of episodes to save on the PC). Podcast feeds may be added to the list of podcasts via Windows Explorer. New episodes may be automatically downloaded, on-demand download of previously published episodes is also supported.

The system and methods of the present invention have been described above via the use of illustrative graphical user interface elements and designs. It is understood that unless otherwise stated to the contrary herein, the functions and methods by which these are generated and rendered may be integrated in a single physical device or a software module in a software product, or may be implemented in separate physical devices or software modules, without departing from the scope and spirit of the present invention.

In this regard it will be appreciated that the automated playback, display, and/or rendering of the various types of media files in conjunction with enhanced metadata entry and modification interfaces described herein could be effected by devices other than those on which the metadata interfaces are presented to a user. By way of example, upon launch of a metadata interface or tooltip by a user on a first device such as a PC, PDA, remote control, cell phone, or the like, programming configured on or available to the first device may cause the subject media file (for which metadata is to be entered by the user) to be played back or rendered across a network to a second device, such as a television, stereo, digital picture frame, media rendered, media streamer, or the like. Exemplary devices and further description of such extended media playback systems and methods may be found in commonly owned U.S. application Ser. No. 09/945,018.

Furthermore, while an exemplary embodiment illustrates user entry of metadata by way of positioning a cursor and clicking a "star" rating, it will be appreciated that alternative methods of user input may be practiced, for example "thumbs up" and "thumbs down" icons or keys on a remote control or keyboard, direct entry of numeric values, audible or gesture input, etc., singly or in combination, as appropriate to a particular implementation. Additionally, it will be appreciated that while illustrated in the context of media management on a computer or entertainment system, the methods disclosed herein may be generally applied to facilitate user entry of metadata in various situations, for example rating of content previously presented in a concert or TV program, rating of artworks or photographs presented in a gallery, capture of user opinions after focus group studies regarding new products, etc., without limitation.

It is to be appreciated that detailed discussion of the actual implementation of each graphical display element and user interface method is not necessary for an enabling understanding of the invention. The actual implementation is well within the routine skill of a programmer and system engineer, given the disclosure herein of the system attributes, functionality, and inter-relationship of the various elements in the system. A person skilled in the art, applying ordinary skill can practice the present invention without undue experimentation.

While the invention has been described with respect to various illustrative examples, it will be apparent to those skilled in the art that various modifications and improvements may be made without departing from the scope and spirit of the invention. Accordingly, it is to be understood that the invention is not to be limited by these specifically illustrated examples. For instance, while exemplary systems have been described herein in connection with audio and photo based media files, it will be understood and appreciated that any media files, including video, multimedia, and even text/data based files could be used in conjunction with the inventive concepts described herein.

All of the cited references are incorporated herein by reference in their entirety

What is claimed is:

1. A method for modification of metadata for a plurality of media files, comprising:
    displaying to a user a metadata interface including at least one metadata field associated with a first media file of the plurality of media files for modification by the user via the metadata interface;
    automatically commencing in connection with display of the metadata interface playback of the first media file according to a preset parameter; and
    upon modification by the user of metadata in the at least one metadata field associated with the first media file via interaction with the metadata interface, storing the updated metadata in association with the first media file;
    wherein the preset parameter causes playback of a media file to automatically commence at a preset percentage into the media file that is after an original starting point of the media file.

2. The method as recited in claim 1, comprising, upon a conclusion of modification by the user of metadata in the at least one metadata field associated with the first media file, automatically modifying the metadata interface to thereby display to the user at least one metadata field associated with a second media file of the plurality of media files for modification by the user via the metadata interface and automatically commencing in connection with display of the modified metadata interface playback of the second media file according to the preset parameter.

3. The method as recited in claim 1, comprising, upon a conclusion of playback of the first media file according to the preset parameter without a modification by the user of metadata in the at least one metadata field associated with the first media file, automatically modifying the metadata interface to thereby display to the user at least one metadata field associated with a second media file of the plurality of media files for modification by the user via the metadata interface and automatically commencing in connection with display of the modified metadata interface playback of the second media file according to the preset parameter.

4. The method as recited in claim 1, wherein the metadata interface comprises a user interface element by which the user indicates a desire to forego modification of metadata in the at least one metadata field associated with the first media file and the method comprises, upon the user interacting with the user interface element, modifying the metadata interface to thereby display to the user at least one metadata field associated with a second media file of the plurality of media files for modification by the user via the metadata interface and automatically commencing in connection with display of the modified metadata interface playback of the second media file according to the preset parameter.

5. The method as recited in claim 1, comprising displaying to the user a listing of the plurality of media files and automatically traversing the listing of the plurality of media files to select the first media file.

6. The method as recited in claim 5, wherein the first media file comprises a first media file encountered within the traversed listing of the plurality of media files to have no user modified metadata in the at least one metadata field.

7. The method as recited in claim 5, wherein the first media file comprises a first media file encountered within the traversed listing of the plurality of media files to have no metadata in the at least one metadata field.

8. The method as recited in claim 1, wherein the at least one metadata field comprises a user's ratings field.

9. A machine readable media having embedded computer executable instructions for use in connection with modification of metadata for a plurality of media files, the instructions performing steps comprising:
  displaying to a user a metadata interface including at least one metadata field associated with a first media file of the plurality of media files for modification by the user via the metadata interface;
  automatically commencing in connection with display of the metadata interface playback of the first media file according to a preset parameter; and
  upon modification by the user of metadata in the at least one metadata field associated with the first media file via the metadata interface, storing the updated metadata in association with the first media file
  wherein the preset parameter causes playback of a media file to automatically commence at a preset percentage into the media file that is after an original starting point of the media file.

10. The machine readable media as recited in claim 9, wherein, upon a conclusion of modification by the user of metadata in the at least one metadata field associated with the first media file, the instructions automatically modify the metadata interface to thereby display to the user at least one metadata field associated with a second media file of the plurality of media files for modification by the user via the metadata interface and automatically commence in connection with display of the modified metadata interface playback of the second media file according to the preset parameter.

11. The machine readable media as recited in claim 9, wherein, upon a conclusion of playback of the first media file according to the preset parameter without a modification by the user of metadata in the at least one metadata field associated with the first media file, the instructions automatically modify the metadata interface to thereby display to the user at least one metadata field associated with a second media file of the plurality of media files for modification by the user via the metadata interface and automatically commence in connection with display of the modified metadata interface playback of the second media file according to the preset parameter.

12. The machine readable media as recited in claim 9, wherein the metadata interface comprises a user interface element by which the user indicates a desire to forego modification of metadata in the at least one metadata field associated with the first media file and, upon the user interacting with the user interface element, the instructions modify the metadata interface to thereby display to the user at least one metadata field associated with a second media file of the plurality of media files for modification by the user via the metadata interface and automatically commence present in connection with display of the modified metadata interface playback of the second media file according to the preset parameter.

13. The machine readable media as recited in claim 9, wherein the instructions display to the user a listing of the plurality of media files and automatically traverse the listing of the plurality of media files to select the first media file.

14. The machine readable media as recited in claim 13, wherein the first media file comprises a first media file encountered within the traversed listing of the plurality of media files to have no user modified metadata in the at least one metadata field.

15. The machine readable media as recited in claim 13, wherein the first media file comprises a first media file encountered within the traversed listing of the plurality of media files to have no metadata in the at least one metadata field.

16. The machine readable media as recited in claim 9, wherein the at least one metadata field comprises a user's ratings field.

17. A method for presenting metadata for a plurality of media files, comprising:
  using an automated tool tip application to cause display of metadata included within at least one metadata field associated with a first media file of the plurality of media files;
  automatically commencing in connection with display of the metadata playback of the first media file according to a preset parameter; and
  upon modification by the user of metadata in the at least one metadata field associated with the first media file via a metadata interface, storing the updated metadata in association with the first media file;
  wherein the preset parameter causes playback of a media file to automatically commence at a preset percentage into the media file that is after an original starting point of the media file.

18. A machine readable media having embedded computer executable instructions for use in connection with presenting metadata for a plurality of media files, the instructions performing steps comprising:
  displaying metadata included within at least one metadata field associated with a first media file of the plurality of media files in response to a mouse-over of a displayed listing of the first media file;
  automatically commencing in connection with display of the metadata playback of the first media file according to a preset parameter; and
  upon modification by the user of metadata in the at least one metadata field associated with the first media file via a metadata interface, storing the updated metadata in association with the first media file;
  wherein the preset parameter causes playback of a media file to automatically commence at a preset percentage into the media file that is after an original starting point of the media file.

* * * * *